United States Patent Office 3,549,493
Patented Dec. 22, 1970

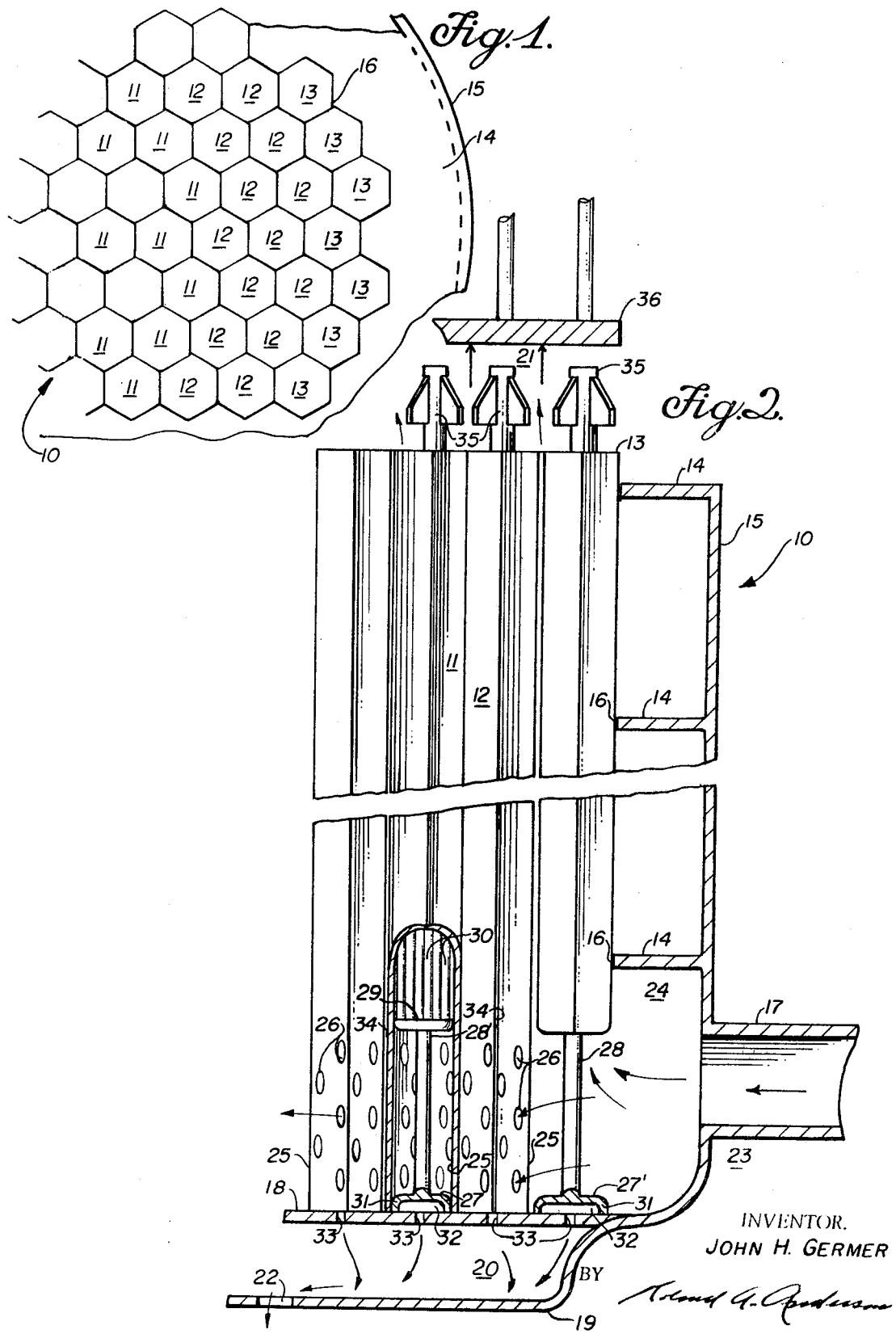

3,549,493
FAST SODIUM-COOLED REACTOR
CORE STRUCTURE
John H. Germer, San Jose, Calif., assignor to the United States of America as represented by the United States Atomic Energy Commission
Filed Jan. 22, 1969, Ser. No. 793,040
Int. Cl. G21c 1/02, 15/00
U.S. Cl. 176—18                                7 Claims

ABSTRACT OF THE DISCLOSURE

A reactor core structure for a liquid metal cooled fast reactor made up of closely packed hexagonal fuel, blanket and reflector bundles which are held tightly together by an orificing pattern which imposes a higher internal pressure in the outer bundles than in the inner bundles, and which is provided with a hydraulic balancing arrangement whereby a separate unclamping arrangement for refueling is eliminated. Two types of inlet plenums are disclosed; the first with the lower end of the bundle casing apertured for forming the plenum; the second with the bundle casing being removed at the lower end.

BACKGROUUND OF THE INVENTION

The invention described herein was made in the course of, or under, Subcontract 31-109-38-1997 under Contract No. W-31-109-ENG-38, with the United States Atomic Energy Commission.

The present invention relates generally to nuclear reactors, and more particularly to a novel structural arrangement for the core and surrounding blanket and reflector bundles of a liquid metal cooled fast reactor.

Much prior effort has been directed to providing means for retaining nuclear fuel bundles properly located in the core of a reactor while providing adequate coolant therefor U.S. Pat. 2,961,393 issued to H. O. Monson and 3,124,514 issued to S. L. Koutz et al. are exemplary of these prior art approaches. Also, various clamping concepts have been developed for securing the various bundles in the reactor in proper position under operating conditions. However, such clamping arrangements require additional time and equipment during removal and replacement of the bundles in the reactor.

SUMMARY OF THE INVENTION

The present invention is directed to a manner of constructing the core of a sodium-cooled fast reactor to have a minimum quantity of structural material. The core is made up of thin hexagonal tubes closely packed together and contained within a rigid outer structure. These hexagonal tubes each contain a multiplicity of small fuel pins to constitute a fuel bundle. Refueling is accomplished by removing and replacing individual fuel bundles. Structural rigidity in the core during operation is accomplished by constructing the individual fuel bundles at the outer edge of the core with orificing at their exits, such that they experience a greater pressure than those in the center of the core. The hexagonal walls of these outer bundles deform under this internal pressure to touch the adjacent fuel bundles in such a way that the central region of the core is held firmly together. In addition, the bundles are provided with a hydraulic balancing arrangement whereby a separate unclamping arrangement for refueling is eliminated. The outer edge of the core is surrounded by a row of reflector bundles, which are rigid relative to the tubes of the fuel and blanket bundles. These reflector bundles are prevented from outward deformation by one or more ring support members whose inner surfaces are formed to the shape of the outer edge of the reflector bundles.

Therefore, it is an object of this invention to provide a core structure for a fast sodium-cooled nuclear reactor.

A further object of the invention is to provide a reactor core structure wherein the fuel bundles align themselves radially without restraint by the support plate.

Another object of the invention is to provide a reactor core structure where the fuel bundles have little or no internal or external pressure other than that which is imposed for the purpose of core clamping.

Another object of the invention is to provide a reactor core structure wherein the fuel, blanket, and reflector bundles are provided with a hydraulic balancing arrangement.

Another object of the invention is to provide a reactor core structure wherein core rigidity during operation is accomplished by constructing the individual fuel bundles at the outer edge of the core such that they experience a greater internal pressure than those in the center of the core and hold the bundles of the central region of the core firmly together.

Other objects and advantages of the invention will become readily apparent from the following description and the accompanying drawings:

BRIEF DESCRIPTION OF THE DRAWINGS

FIG. 1 is a schematic plan view of a reactor core incorporating the invention; and FIG. 2 is a partial view, partially in cross-section, of a sodium-cooled nuclear reactor utilizing the inventive core structure.

DESCRIPTION OF THE INVENTION

FIG. 1 shows a partial plan view of a reactor generally indicated at 10. Three types of hexagonal bundles are shown: (1) fuel bundles 11, constituting the major heat generating section of the reactor core; (2) radial blanket bundles 12, containing fertile material for conversion into fuel; and (3) reflector bundles 13, serving as a structural boundary for the core, and also serving to assist in reflecting neutrons back into the core.

The embodiment illustrated in FIG. 1 shows two rows of radial blanket bundles 12 and one row of reflector bundles 13, with the interior or the reactor core constituting several rows of fuel bundles 11. Any member of rows of bundles 11, 12 and 13 may be utilized, dependent on the type of reactor and the operational requirements thereof. Although not shown in the drawings, some of the fuel bundles 11 would be constructed with a control rod centrally located within a central guide tube, as known conventionally in the art. The control rods would be handled as part of the fuel bundle when the bundle is replaced, and would be coupled to a top mounted drive mechanism, known in the art.

The core of reactor 10, made up of the three types of bundles 11, 12 and 13, is surrounded by structural rings 14 (three being shown in FIG. 2), rings 14 being supported by a container or vessel wall 15. The inner surfaces of the rings 14, generally indicated at 16, are constructed to the contour of the outside (hexagonal) surfaces of the reflector bundles 13 in such a way as to resist outward loads, and with only sufficient clearance to permit removal of fuel bundles 11 or the other bundles 12 or 13, and to permit relative thermal expansion.

The vessel wall 15 of reactor 10 is provided at the lower end thereof with a coolant inlet or conduit 17, the coolant being a liquid metal such as sodium. A flat top surface support plate 18 extends across the bottom of the reactor core, plate 18 having a housing 19 attached thereto and defining a plenum 20 which is at approximately the pressure of the reactor coolant outlet above the bundles 11, 12 and 13 and indicated at 21. Coolant from outlet 21, for example, may be directed through appropriate heat exchange and pumping mechanism for recirculation into inlet 17. Generally, the vessel containing the bundles 11, 12 and 13 is surrounded by coolant, such as sodium, and leakage from plenum 20 via an aperture 22 in housing 19 goes into the surrounding coolant indicated at 23.

The lower ends of outer fuel bundles 11 and bundles 12 and 13 are constructed to define an inlet plenum, generally indicated at 24, to permit coolant to flow horizontally from the inlet 17 to the various parts of the core. This is accomplished by either the lower construction of the fuel and radial blanket bundles 11 and 12 or as shown on the reflector bundle 13. In the former arrangement, the fuel bundle (bundle 11 or 12) hexagonal tube or casing forming the outer contour of the bundle is extended to the lower extremity 25 of the bundle. The sides of the tube or casing in the region of the plenum 24 are perforated by holes 26 which align with each other to allow horizontal flow of the coolant from inlet 17. The lower end 25 of the hexagonal tube of the bundle 11 or 12 is joined to a hexagonal bottom plate 27. In the embodiment shown on the reflector bundle 13, the hexagonal contour of the bundle tubing or casing is interrupted in the plenum region and a bottom plate 27' is connected to the upper section of the bundle by a central rod 28. The internal construction of the fuel bundle 11 in the plenum area or region 24 contains a central rod 28' joining the bottom plate 27 with a fuel pin support member 29 attached to fuel pins 30 which contain the desired fuel composition as conventionally known. Bundle 12 is similarly constructed except that the pins are composed of a fertile material in accordance with known reactor construction. Reflector bundle 13 may be composed of solid stainless steel penetrated by cooling passages. Also, it should be noted that only one row of radial blanket bundles 12 is shown in FIG. 2 for purposes of simplicity in describing the invention. Also, if desired the lower extremity of bundles 11 and 12 can be constructed similar to that of bundle 13 as shown in FIG. 2. The central rod 28 of bundle 13 or 28' of bundles 11 and 12 resists in tension the upward pressure loading of the fuel pins 13 due primarily to the equal pressures against bottom plate 27 or 27' and the pin support 29.

Bottom plates 27 and 27' are constructed to include a flange portion 31 defining therein spaces 32 between the bottom plate and the flat top surface of support plate 18, the spaces 32 being vented to plenum 20 via holes or apertures 33 in plate 18. The flange portion 31 of bottom plates 27 and 27' forms a seal at the lower extremity 25 of bundle 11, 12 or 13 with the flat top surface of the support plate 18. If desired, the flange portion 31 may be omitted from the bottom plates and a separate hexagonal seal attached to the plates at essentially the outer dimension of the bundle 11, 12 or 13. Thus, the upward coolant pressure force on the fuel pin support 29 is balanced by the downward coolant pressure force on the bottom plate 27, resulting in little or no net upward pressure force on the bundle. Since the bundles lower ends 25 are spaced closely together, the leakage past the seal 31 would be restricted at this narrow space indicated at 34 to prevent gross leakage of coolant via holes 33 if the bundles were to be slightly raised. Excessive upward misalignment of the bundles is prevented by interference between the bundle handle 35 and a rigid hold-down grid 36 located in outlet 21 and normally spaced sufficiently to permit differential thermal expansion.

It is thus seen, as indicated by the flow arrows, that coolant, such as sodium, entering plenum 24 via inlet 17 is circulated upwardly through and around the outer fuel bundles 11 and the bundles 12 and 13 and discharged via outlet 21 at the top thereof, while leakage around the lower end 25 of the bundles is directed outwardly via plenum 20 and aperture 22 of housing 19 for recirculation through the core of the reactor. While not shown, additional core clamping may be obtained by orificing the outlets of the outer fuel bundles such that the outer fuel bundles have a greater internal pressure than the inner bundles.

The advantages of the present invention are as follows:

(1) The lower support plate 18 is extremely simple, requiring no more precise machining than the provision of a flat upper surface.

(2) The fuel bundles are permitted to align themselves radially without restraint by the support plate.

(3) Flow leakage past the lower seal of the fuel bundle can be easily directed back into the pump inlet, where it does not dilute the outlet temperature of the reactor.

(4) Fuel bundles have little or no internal or external pressure other than that which is deliberately imposed by outlet orificing for the purpose of core clamping. Note that it is possible to perforate the fuel bundle tube walls (except at the outer edge of the reactor core) where such perforation does not seriously interface with orificed flow distribution.

(5) Refueling does not require a separate unclamping operation, since clamping is accomplished by the internal pressure of the outer bundles.

(6) The use of the reflector bundles restrained by structure support rings to assist in core clamping.

If desired, each of the bundles may be provided with the novel terminal end construction such that all of the bundles in the core are internally pressurized, rather than only the outer ones as described above. With this arrangement, core clamping is attained by orificing the outlets of the outer bundles such that the outer bundles have a greater internal pressure than the inner ones.

It is thus seen that the present invention provides a reactor core structure made up of closely packed hexagonal fuel bundles which are held tightly together by a bundle lower end construction which imposes a higher internal pressure in the outer bundles than in the inner bundles, thus providing core clamping.

While particular embodiments of the invention have been illustrated and described, modifications and changes will become apparent to those skilled in the art, and it is intended to cover in the appended claims all such modifications and changes as come within the spirit and scope of the invention.

I claim:

1. In a liquid metal cooled nuclear reactor having a core structure, said core structure comprising: a vessel having at least one support ring secured to the internal wall surface thereof, a bottom support plate having a flat top surface, a housing secured to said support plate and defining a plenum therein, said bottom support plate being provided with a plurality of apertures providing communication between said vessel interior and said plenum, said housing having at least one drainage passage therein, and coolant inlet means at the lower portion of said vessel, said plenum having a lower internal pressure than the pressure in said vessel; at least one row of closely packed reflector bundles positioned adjacent said support ring; said support ring having an inner surface contoured to the configuration of said reflector bundle exterior surface adjacent thereto; at least one row of closely packed radial blanket bundles positioned closely adjacent said reflector bundles; and a plurality of rows of closely packed fuel bundles positioned radially within and closely adjacent said radial blanket bundles; each of said reflector, blanket and fuel bundles respectively containing appropriate reflector, blanket, and fuel materials, the number of reflector, blanket and fuel bundles being equal to the number of apertures in said bottom support plate; each of said reflector and blanket bundles and at least certain of said outer fuel bundles being provided at the lower end thereof with a hydraulic balancing arrangement for preventing upward movement thereof by force of circulating coolant wherein said reflector, blanket and fuel bundles are each positioned above one of said apertures in said bottom support plate; and wherein said hydraulic balancing arrangement includes a bottom plate, a support member and a rod means interconnecting said support member and bottom plate, said bottom plate being provided with a sealing means in contact with said bottom support plate and defining a space intermediate same, said space being in fluid communication with said plenum of said housing via one of said apertures in said bottom support plate; each of said reflector and blanket bundles and at least certain of said outer fuel bundles being constructed at the lower end portion thereof to define an inlet plenum for allowing horizontal flow of coolant from said inlet means to each of said reflector, blanket and fuel bundles; said reflector, blanket and outer fuel bundles being constructed so as to have a greater internal coolant pressure therein than the internal coolant pressure of the remaining fuel bundles wherein said reflector, blanket and outer fuel bundles each have a non-perforated casing, a coolant inlet and a coolant outlet with orifice means at said outlet, the difference between said greater internal coolant pressure and said internal coolant pressure being sufficient to cause said casings of said reflector, blanket and outer fuel bundles to expand outwardly against one another creating positive core clamping of the bundles within said vessel.

2. The core structure defined in claim 1, wherein said reflector, blanket and fuel bundles are of a hexagonal cross-sectional configuration; and wherein said vessel is provided with three of said support ring in spaced relationship along the internal wall surface thereof.

3. The core structure defined in claim 3, wherein said sealing means comprises a flange-like portion of said bottom plate extending toward and in contact with said bottom support plate.

4. The core structure defined in claim 3, wherein said sealing means comprises a seal member secured to said bottom plate about the periphery of the surface thereof adjacent said bottom support plate.

5. The core structure defined in claim 1, wherein at least certain of said bundles each has a casing extending to said bottom support plate, said casing being provided at the lower portion thereof with openings to allow horizontal flow of coolant therethrough; and wherein said hydraulic balancing arrangement is located within said casing.

6. The core structure defined in claim 1, wherein at least certain of said bundles each has a casing terminating adjacent said inlet plenum; and wherein said hydraulic balancing arrangement is located below the terminal end of said casing.

7. The core structure defined in claim 1, wherein said bundles are each provided with a handle means at the upper end thereof; and additionally including a rigid hold-down assembly spaced from said handle means for preventing excessive upward misalignment of said bundles.

References Cited

UNITED STATES PATENTS

| | | | |
|---|---|---|---|
| 3,235,465 | 2/1966 | McDaniel et al. | 176—87X |
| 3,383,287 | 5/1968 | Jackson | 176—50X |

BENJAMIN R. PADGETT, Primary Examiner

H. E. BEHREND, Assistant Examiner

U.S. Cl. X.R.

176—50, 61, 87